United States Patent [19]

Massel

[11] Patent Number: 5,193,415
[45] Date of Patent: Mar. 16, 1993

[54] CONTINUOUS RADIAL SHIELD FOR AUTOMATIC TRANSMISSION

[75] Inventor: Bruno H. Massel, Bensenville, Ill.

[73] Assignee: Bruno's Automotive Products Inc., Bensenville, Ill.

[21] Appl. No.: 710,148

[22] Filed: Jun. 4, 1991

[51] Int. Cl.$^5$ ............................................. F16H 57/02
[52] U.S. Cl. ..................... 74/606 R; 74/608; 180/346
[58] Field of Search .............. 74/606 R, 608, 609, 74/612; 180/346, 374

[56] References Cited

U.S. PATENT DOCUMENTS

| | | | |
|---|---|---|---|
| 808,995 | 1/1906 | Lincoln | 74/609 |
| 2,775,905 | 1/1957 | Jackson | 74/609 |
| 3,207,142 | 9/1965 | Gorissen et al. | 74/606 R |
| 3,296,890 | 1/1967 | Anderson | 74/608 |
| 3,455,409 | 7/1969 | Clark | 74/608 |
| 3,942,502 | 3/1976 | Gorres et al. | 74/606 R |
| 4,383,704 | 5/1983 | Yoshitsuga | 74/608 |
| 4,719,815 | 1/1988 | Sherman | 74/606 R |
| 4,951,527 | 8/1990 | Klazura | 74/606 R |
| 5,042,321 | 8/1991 | Hongo et al. | 74/606 R |

OTHER PUBLICATIONS

Mar. 18, 1983, National Dragster, p. 11. Installation Instructions.

*Primary Examiner*—David A. Scherbel
*Assistant Examiner*—Winnie Yip
*Attorney, Agent, or Firm*—McAndrews, Held & Malloy

[57] ABSTRACT

This patent discloses a shield for an automatic transmission used in race cars radial that includes a strengthened fluid pan and a formed metal jacket shield that extends around the section of the housing of the transmission adjacent to the fluid pan from opposite sides of the fluid pan. The strengthened fluid pan is constructed to extend outwardly from the transmission housing to provide locations at which the jacket shield may be secured to the fluid pan and to increase the volume of the fluid pan as compared to conventional fluid pans. The jacket shield is secured directly to the fluid pan and in combination with the fluid pan provides a shield that continuously surrounds the transmission and resists perforation and separation due to impact of fragments propelled from the transmission after breakage of rotating components of the transmission.

5 Claims, 1 Drawing Sheet

CONTINUOUS RADIAL SHIELD FOR AUTOMATIC TRANSMISSION

BACKGROUND OF THE INVENTION

This invention relates to a shield that surrounds a section of an automatic transmission adjacent to the transmissions's large rotating components and that contains fragments created by breakage of a rotating component. More particularly, this invention relates to a shield that includes a strengthened fluid pan and a rigid metal plate jacket that conforms to a section of the exterior surface of the transmission and mounts directly to the strengthened fluid pan.

Automatic transmissions manufactured for conventional automobiles can catastrophically fail when used in race cars. Large rotating components are both the fastest moving and highest stressed components of the transmission and consequently are frequently a source of dangerous transmission failures. Rotating components of an automatic transmission rotate about a transmission axis that extends through the transmission along a driveline direction of the transmission. Breakage of a large rotating component can create fragments that are propelled in a direction radially away from the transmission axis by the momentum of the rotating component. Those fragments can break other parts of the transmission creating additional fragments and openings that provide a path for fast-moving fragments to escape. Such fragments can injure the driver and others and can be sharp enough to puncture tires of the race car. Further, fluid escaping from the transmission through holes created by fragments can coat the race car's tires or the race track causing loss of traction. Both tire punctures and loss of traction can cause the race car to be difficult to control and possibly cause an accident.

Automatic transmissions typically have a housing surrounding the rotating components and a fluid pan mounted to an underside of the housing adjacent to the large rotating components. Fluid pans having greater volume and made from stronger materials than conventional automatic transmission fluid pans are used in race cars to increase the volume of fluid available to the transmission and provide increased cooling of transmission fluid. These fluid pans typically provide increased fluid capacity compared to conventional fluid pans by extending farther below the transmission housing than conventional fluid pans, thereby decreasing clearance between the fluid pan and ground below the transmission. They also provide increased resistance to penetration by fragments compared to conventional fluid pans.

In addition to strengthened fluid pans, shields are placed adjacent to the section of the transmission surrounding large rotating components to prevent fragments from escaping from the transmission at high speed. These shields increase the safety of the race car at a cost of increased difficulty of maintenance of the transmission. Two types of shields have been used to prevent fragments from an automatic transmission from creating a safety hazard. One is a flexible "blanket" shield that is wrapped around an exterior surface of the housing and fluid pan. The other type is a rigid jacket shield that is a formed metal plate that generally conforms to the housing and is positioned closely adjacent to an exterior surface of the housing adjacent to large rotating components of the transmission. These types of shield provide different degrees of protection and present different disadvantages.

A blanket shield is continuous flexible shield that completely surrounds the section of the exterior of the automatic transmission adjacent to large rotating components. A blanket shields generally wraps around on itself to assure containment of all fragments and accommodate some variation in installation of the blanket shield and shape of the transmission and connections to the transmission. They include mounting straps that are secured to the transmission or engine to prevent the blanket shield from sliding away from the transmission. Blanket shields are cumbersome and can interfere with exterior connections of the transmission, such as cooling lines and shift linkage. Further, they surround the fluid pan and inhibit cooling of fluid in the fluid pan. Installation of a blanket shield can be time consuming because of the necessity of assuring that the blanket does not interfere with the various connections to the transmission.

Jacket shields are conventionally a metal plate that is formed to closely conform to the section of the exterior surface of the transmission housing adjacent to the large rotating components. Jacket shields have connection access holes and borders that are shaped to allow connections to the transmission without interference with the plate shield. A jacket shield must be mounted to the transmission to accurately position the access holes and borders adjacent the locations of transmission connections. Jacket shields are typically mounted to the transmission housing by attaching brackets to the housing using one or two fluid pan mounting holes on two sides of the housing and bolting the shield to the brackets. Straps are positioned closely adjacent to the fluid pan and connected to the brackets o the sides of the transmission housing to assure that the jacket plate shield will remain adjacent to the rotating components of the transmission in the event that the brackets become separated from the housing.

Jacket shields avoid interference with connections to a transmission, do not significantly interfere with heat transfer through the fluid pan, and are generally easier to install than blanket shields. However, they are not an ideal solution for the problems of either safety or ease of installation. Jacket shields do not surround the fluid pan. The jacket shield conventionally extends around the transmission housing from locations on opposing sides of the transmission that are adjacent to and slightly separated from fluid pan mounting sections of the transmission. The jacket shield protects the driver and others from fragments that may be ejected through the housing of the transmission, but does not provide protection from fragments that may eject through the fluid pan.

Use of a strengthened fluid pan with a jacket shield improves protection at the underside of the transmission. Strengthened and enlarged fluid pans require that brackets and straps that secure a jacket shield to the transmission accommodate a range of sizes of fluid pans. Brackets either have several pieces that must be assembled to position straps close to the fluid pan, or position straps away from the fluid pan potentially allowing movement of the shield. At a minimum, the brackets and straps include several pieces that must be assembled and increase the time required to assemble the transmission and shield. Further, the strengthened fluid pan and jacket shield do not provide a continuous shield surrounding the rotating components of the transmission. The fluid pan is held in place by the conventional fluid pan mounting, usually several bolts. The jacket shield is held in place by the brackets connected to the housing by a small number of fluid pan mounting bolts. This assembly does not provide direct connection between the jacket shield and the strengthened fluid pan and consequently does not provided a continuous shield that can resist separation at all locations around the axis of the rotating components of the automatic transmission.

A need therefore exists for a shield for an automatic transmission that: provides protection from ejection of fragments created by breakage of a rotating component of an automatic transmission at all locations radially adjacent to the rotating components; will resist separation at all locations around the rotating components; and does not interfere with connections to the automatic transmission. In addition, the need also exists for a shield that can be quickly assembled and mounted to an automatic transmission. The need further exists for a fluid pan for an automatic transmission that provides increased volume compared to conventional fluid pans without extending an unacceptable distance from the housing of the transmission and that enhances cooling of the fluid within the fluid pan.

SUMMARY OF THE INVENTION

This invention overcomes the disadvantages of automatic transmission shields currently used in race cars that were discussed above. A shield is provided that includes a strengthened fluid pan and a jacket shield that conforms to a section of an exterior surface of a housing of an automatic transmission adjacent to the large rotating components of the transmission and is directly secured to the fluid pan. More particularly, the fluid pan provides larger volume and increased fluid cooling capacity than conventional fluid pans and has sides that are shaped to extend outwardly to sides of the transmission housing. The jacket shield extends adjacent to the sides of the fluid pan and the jacket shield and fluid pan are secured to each other at the sides of the fluid pan.

Accordingly, it is an object of the present invention to provide a continuous shield for an automatic transmission that radially surrounds the large rotating components of the transmission.

Another object of the present invention is to provide a shield that does not require brackets or hardware other than fasteners to assemble and mount the shield to an automatic transmission.

Yet another object of the invention is to provide a strengthened fluid pan for an automatic transmission that is constructed to resist perforation by fragments created by failure of a large rotating component of the transmission and to be directly fastened to a jacket shield.

A further object of the present invention is to provide a strengthened fluid pan for a automatic transmission that provides increased fluid capacity and fluid cooling compared to conventional fluid pans without significantly decreasing the clearance between the fluid pan and the ground.

These and other objects and advantages of the present invention, as well as details of the preferred embodiment thereof, will be more fully understood from the following description and the drawings.

Figure 1:
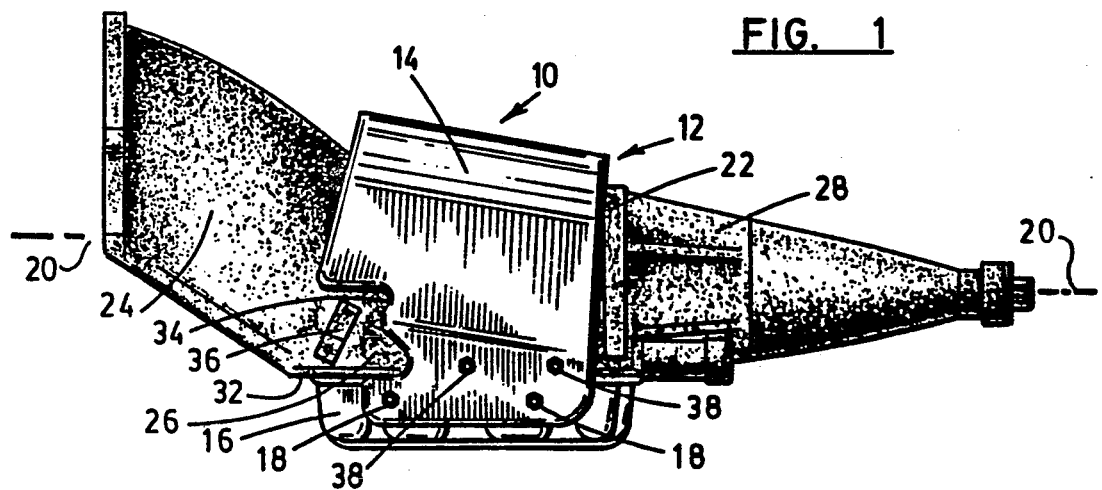
FIG. 1 is a side view of an automatic transmission and a shield according to the present invention.

In the following detailed description, spatially orienting terms are used such as "left," "right," "upward," "downward," and the like. It is to be understood that these terms are used for convenience of descirption of the preferred embodiments by reference to the drawing; unless so specified, thesess terms do not necessarily describe the absolute location in space, such as left, right, upward, downward, etc., that any part must assume.

DESCRIPTION OF THE PREFERRED EMBODIMENT

FIG. 1 shows a shield 10 according to the present invention mounted to an automatic transmission 12. Transmission 12 includes a transmission housing 22 including a bell housing section 24, a gearbox section 26, and a tail section 28. Gearbox section 26 surrounds large rotating components of transmission 12 such as planetary gears and clutch drums (not shown). The large rotating components of transmission 12 rotate about a transmission axis 20 extending centrally through transmission 12 that defines an axial direction and radial directions perpendicular to axis 20. Shield 10 includes jacket 14 formed from a metal plate and strengthened fluid pan 16. Jacket 14 is fastened to fluid pan 16 by two jacket mounting bolts 18.

Figure 2:
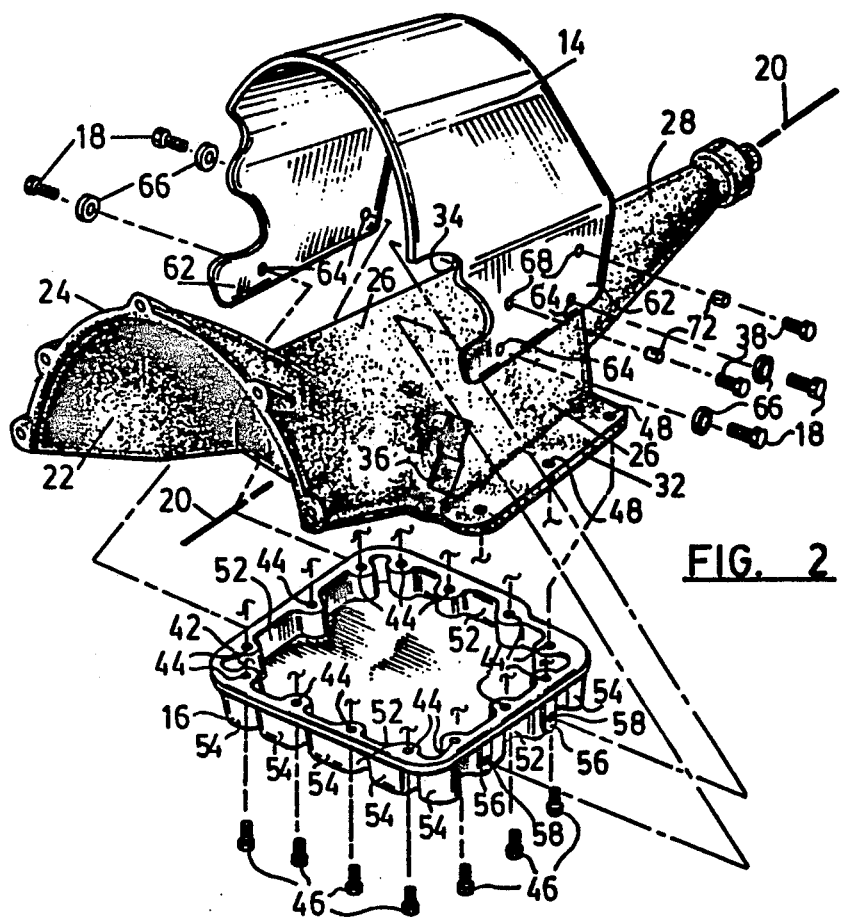
FIG. 2 is an exploded perspective view of a shield according to the present invention and an automatic transmission.

Gearbox section 26 has a pan mounting section 32 that is the section of gearbox section 26 that is positioned closest and generally parallel to ground beneath a race car when transmission 12 is installed in a race car in its intended operating orientation as illustrated by FIGS. 1 and 2. Fluid pan 16 is mounted to and extends downwardly from pan mounting section 32 when transmission 12 is in its operating orientation. Gearbox section 26 and fluid pan 16 cooperate to radially surround the large rotating components within gearbox section 26.

Jacket 14 is constructed to radially surround gearbox section 26 adjacent to fluid pan 16 and extend adjacent to fluid pan 16. A transmission shift lever 36 extends from transmission 12. Jacket 14 is fastened to fluid pan 16 and formed having a shift lever notch 34 formed to avoid transmission shift lever 36. Shifter mounting bolts 38 engage jacket 14 providing locations for mounting a shifter linkage (not shown) to jacket 14 adjacent to transmission shift lever 36.

FIG. 2 illustrates the components and mounting fasteners for shield 10. Fluid pan 16 has a mounting flange 42 that is constructed to conform to pan mounting section 32 of gearbox section 26. Flange 42 has mounting holes 44 extending therethrough that are sized to allow a threaded section of pan mounting bolts 46 to slide therethrough. Heads of pan mounting bolts 46 abut flange 42 adjacent to mounting holes 44. Pan mounting holes 44 are positioned to allow pan mounting bolts 46 to slide therethrough and engage threaded pan mounting holes 48 in pan mounting section 32. Pan mounting bolts 46 fasten fluid pan 16 to pan mounting section 32 by extending through pan mounting holes 33 and engaging threaded pan mounting holes 48.

Fluid pan 16 has sides 52 extending from fluid pan mounting flange 42 away from housing pan mounting section 32 defining an interior of fluid pan 16 having a generally rectangular cross-section. Sides 52 of fluid pan 16 are formed having scalloped sections 54 extending outwardly from the interior of fluid pan 16 adjacent to fluid pan mounting holes 44. Scalloped sections 54 provide an increased surface area of fluid pan sides 52 compared to a fluid pan having generally planar sides. Further, scalloped sections 54 define a larger volume of the interior of fluid pan 16 compared to a fluid pan having planar sides extending an equal distance from pan mounting section 32 from the inner extent of flange 42. Fluid pan 16 includes two jacket mounting bosses 56 on the sides 52 lying along the axial direction of transmission 12. Jacket mounting bosses 56 on a side 52 are separated by a distance along the direction of transmission axis 20 and extend to the outermost extent of mounting flange 42. Jacket mounting bosses 56 include threaded jacket boss mounting holes 58 that are sized to be engaged by threaded sections of jacket mounting bolts 18. It is presently preferred that the thickness of fluid pan 16 is within the range of ¼ inch to 5/16 inch and is cast of a material known in the art as "Tenzalloy" that is similar to a material conforming to ASTM specification ZC81A.

Jacket 14 is formed in a generally U-shaped cross section to be positioned radially adjacent to gearbox section 26 and extend two pan mounting sections 62 adjacent to jacket mounting bosses 56. It is presently preferred that jacket 14 be formed from ¼ inch thick aluminum alloy sheet designated 6061-T6. Each pan mounting section 62 includes two jacket mounting holes 64 that are positioned adjacent to jacket boss mounting holes 58 and sized to allow a threaded section of a jacket mounting bolt 18 to slide therethrough. Jacket 14 is mounted to fluid pan 16 by positioning jacket 14 adjacent to gearbox section 26 and jacket mounting holes 64 adjacent to jacket boss mounting holes 58. Jacket mounting washers 66 are sized to slide over a threaded section of jacket mounting bolt 18 and to abut the head of jacket mounting bolt 18. Jacket mounting washers 66 are positioned surrounding a threaded section of jacket mounting bolt 18 and adjacent to a head of jacket mounting bolt 18. Jacket mounting bolt 18 is passed through a jacket mounting hole 64 and threaded into a jacket boss mounting hole 58 to an extent that positions jacket mounting washer 66, adjacent jacket 14 and a head of jacket mounting bolt 18 directly securing jacket 14 to fluid pan 16. It is presently preferred that jacket mounting bolts 18 be 5/16-18 SAE grade 8 bolts.

Jacket 14 further includes two threaded shifter mounting holes 68 positioned adjacent to shift lever notch 34. Shifter mounting spacers 68 are generally cylindrical spacers sized to slide over a threaded section of shifter mounting bolts 46 and engage the head of shifter mounting bolt 38. Jacket 14 has threaded shifter mounting holes 68 that are sized to be engaged by the threaded section of shifter mounting bolts 38. Shifter mounting bolts 38 may be used in conjunction with shifter mounting spacers 72 to secure transmission shifter linkage (not shown) in a position at which it may engage transmission shift lever 36.

A shield according to the present invention constructed as described above has been shown to withstand being struck by fragments created by breakage of a large component of an automatic transmission rotating at a speed greater than 12,000 revolutions per minute within a transmission housing. The jacket shield and fluid pan remained imperforate and fastened together containing both fragments of the rotating component and fragments of the housing created by fragments of the rotating component.

The foregoing is a description of the preferred embodiments. The scope of this invention is determined, however, by reference to the following claims.

I claim:

1. A shield in combination with an automatic transmission having a housing including a pan mounting section adjacent to transmission components rotating about a transmission axis comprising:

a fluid plan constructed to remain imperforate after impact by fragments created by failure of the rotating transmission components and being mounted to the pan mounting section;

a jacket constructed to remain imperforate after impact by fragments created by failure of the rotating transmission components and formed to radially surround a section of the housing adjacent to the rotating transmission components and secured to the fluid pan; and the jacket being fastened directly to the fluid pan to maintain attachment of the jacket to the fluid pan during and after impact of the shield by fragments created by failure of the rotating transmission components, the jackets being secured to the housing indirectly by attachment to the fluid pan which fluid pan is then fixedly connected to the pan mounting section of the housing and thereby the jacket and fluid pan provide a continuous shield that radially surrounds the rotating transmission components that withstands penetration by fragments created by failure of the rotating transmission components, and withstand separation of the fluid pan and the jacket due to impact by fragments created by failure of the rotating transmission components.

2. The shield of claim 1 further comprising a jacket mounting bolt having a threaded section and a head, and wherein the fluid pan has a jacket boss defining a threaded mounting hole sized to be engaged by the threaded section of the jacket mounting bolt, the jacket has a jacket mounting section extending adjacent to the jacket boss and defining a mounting hole adjacent to the jacket boss mounting hole and sized to allow the threaded section of the jacket mounting bolt to slide through the jacket mounting hole and to allow the head of the jacket mounting bolt to abut the jacket mounting section adjacent to the jacket mounting hole, and the jacket mounting bolt is threaded into the jacket boss mounting hole to abut the head of the mounting bolt against the jacket mounting section securing the jacket to the jacket boss of the fluid pan.

3. The shield of claim 2 wherein the fluid pan has spaced apart first and second sides and is adapted to be mounted to the pan mounting section to generally align the first and second sides with the transmission axis, the jacket boss and a second jacket boss are formed by the first side of the fluid pan and are separated along the first side of the fluid pan and the fluid pan has first and second jacket bosses formed by the second side of the fluid pan that are separated along the second side of the fluid pan, and the second jacket boss on the first side and the first and second jacket bosses on the second side each defining a threaded mounting hole sized similar to the threaded mounting hole of the jacket boss formed by the first side, the jacket mounting section extending adjacent to the second jacket boss on the first side of the fluid pan and defining a second mounting hole adjacent to the threaded mounting hole defined by the second jacket boss on the first side of the fluid pan, the second jacket mounting hole of the jacket mounting section sized similarly to the jacket mounting hole, the jacket having a second jacket mounting section extending adjacent to the first and second jacket bosses formed by the second side of the fluid pan and defining first and second mounting holes respectively adjacent to the threaded mounting holes of the first and second jacket of the second side of the fluid pan and sized similarly to the jacket mounting hole of the jacket mounting section, and the shield further having second, third, and fourth jacket mounting bolts sized similarly to the jacket mounting bolt and the second, third, and fourth jacket mounting bolts are respectively threaded into the second jacket boss mounting hole of the first side of the fluid pan, and the first and second jacket boss mounting holes of the second side of the fluid pan.

4. The shield of claim 3 further comprising four mounting bolt washers sized to slide over the threaded section and abut the head of the mounting bolts, each washer positioned on one of the mounting bolts and interposed between the head of the mounting bolt and the jacket.

5. The shield of claim 3 wherein the fluid pan has a front side and back side extending between the first and second sides, the sides defining a pan interior and a mounting flange extending outwardly from the pan interior along an upper edge of the sides and defining flange mounting holes, the sides of the fluid pan being outwardly scalloped between the flange mounting holes whereby the interior of the pan has increased volume and cooling of fluid within the interior of the fluid pan is enhanced.

* * * * *